United States Patent
Saitou (10) Patent No.: US 12,530,009 B2
(45) Date of Patent: Jan. 20, 2026

(54) TOOL PATH CORRECTION DEVICE

(71) Applicant: FANUC CORPORATION, Yamanashi (JP)

(72) Inventor: Kiwamu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 414 days.

(21) Appl. No.: 18/040,132

(22) PCT Filed: Sep. 3, 2021

(86) PCT No.: PCT/JP2021/032388
§ 371 (c)(1),
(2) Date: Jan. 31, 2023

(87) PCT Pub. No.: WO2022/054703
PCT Pub. Date: Mar. 17, 2022

(65) Prior Publication Data
US 2024/0027988 A1    Jan. 25, 2024

(30) Foreign Application Priority Data
Sep. 9, 2020    (JP) .................................. 2020-151329

(51) Int. Cl.
*G05B 19/404*    (2006.01)
(52) U.S. Cl.
CPC .. *G05B 19/404* (2013.01); *G05B 2219/39364* (2013.01)
(58) Field of Classification Search
None
See application file for complete search history.

(56) References Cited

U.S. PATENT DOCUMENTS 4,704,687 A * 11/1987 Kishi ............... G05B 19/40937
700/190
5,247,451 A * 9/1993 Sawamura ............. G05B 19/41
700/178

(Continued)

FOREIGN PATENT DOCUMENTS

CN    105122161 A    12/2015
JP    S62-049505 A    3/1987

(Continued)

OTHER PUBLICATIONS

International Search Report issued in PCT/JP2021/032388; mailed Nov. 22, 2021.

(Continued)

*Primary Examiner* — Jason Lin
(74) *Attorney, Agent, or Firm* — Studebaker Brackett PLLC (57) ABSTRACT

Provided is a tool path correction device which makes it possible to correct a tool path along which a tool moves so as to make it possible to accurately machine a workpiece into a target shape. A tool path correction device according to one aspect of the present disclosure is equipped with: a tool path acquisition unit which acquires tool path information which specifies, using a plurality of command points through which a tool should pass, a tool path along which said tool, which machines a workpiece, moves; a tool shape acquisition unit for acquiring tool shape information which specifies the shape of said tool; a target shape acquisition unit for acquiring target shape information, which specifies the target shape after the workpiece is machined; and a command point addition unit for adding an additional command point as a new command point in a location near a characteristic change point where the characteristics of the target shape change.

3 Claims, 4 Drawing Sheets

(56) References Cited

U.S. PATENT DOCUMENTS

| | | | | |
|---|---|---|---|---|
| 5,289,383 | A | * | 2/1994 | Sawamura .............. G05B 19/41 |
| | | | | 700/187 |
| 5,815,400 | A | * | 9/1998 | Hirai .................... G05B 19/401 |
| | | | | 700/184 |
| 11,654,522 | B2 | * | 5/2023 | Liao ..................... G05B 19/406 |
| | | | | 29/407.01 |
| 2008/0215174 | A1 | * | 9/2008 | Kanai ..................... G06F 30/00 |
| | | | | 700/98 |
| 2010/0146802 | A1 | * | 6/2010 | Ehlerding .............. B23Q 1/445 |
| | | | | 33/503 |
| 2013/0211578 | A1 | * | 8/2013 | Tanuma ............. G05B 19/4093 |
| | | | | 700/192 |
| 2014/0172153 | A1 | * | 6/2014 | Nishibashi ......... G05B 19/4103 |
| | | | | 700/192 |
| 2015/0112473 | A1 | * | 4/2015 | Hasegawa ................ B23H 7/06 |
| | | | | 700/162 |
| 2015/0112474 | A1 | * | 4/2015 | Mizuno ............... G05B 19/182 |
| | | | | 700/187 |
| 2018/0299859 | A1 | * | 10/2018 | Kaneko .................. G05B 19/41 |
| 2019/0137975 | A1 | * | 5/2019 | Nishiwaki .............. G05B 19/41 |

FOREIGN PATENT DOCUMENTS

| | | | | |
|---|---|---|---|---|
| JP | H09-270027 | A | | 10/1997 |
| JP | 2008186046 | A | * | 8/2008 |
| JP | 5606658 | B1 | | 10/2014 |
| JP | 6157781 | B1 | | 7/2017 |
| JP | 2019-082851 | A | | 5/2019 |
| WO | WO-2020021793 | A1 | * | 1/2020 ......... G05B 19/4093 |

OTHER PUBLICATIONS

Shujiel, S. et al.; "Command Point Correction and Smooth Tool Path Generation Method in CNC System"; Journal of Chinese Computer Systems; Sep. 15, 2018; total 14 pages; vol. 39, No. 9.

* cited by examiner

TOOL PATH CORRECTION DEVICE

TECHNICAL FIELD

The present invention relates to a tool path correction device.

BACKGROUND ART

In order for a machine tool to machine a workpiece using a tool, a target shape (product shape) that the workpiece should have after being machined is created by a CAD system or the like, and commands directed to a numerical controller are generated to cause the tool to make a relative movement in conformity with the target shape. Since the tool has a three-dimensional shape, the profile of a movement path along which the tool moves does not completely coincide with the surface shape of the workpiece after being machined. For this reason, there has been proposed a device that corrects a movement path of a tool in consideration of the shape of the tool (for example, see Patent Document 1).

Patent Document 1: Japanese Patent No. 6157781

DISCLOSURE OF THE INVENTION

Problems to be Solved by the Invention

Usually, information regarding a tool path along which a tool moves is expressed as a collection of coordinates of a plurality of command points through which the tool should pass. In other words, a tool of a machine tool moves along a path that is composed of a plurality of command points included in tool path information and straight lines connecting the plurality of command points. Therefore, in a case where a target shape of a workpiece has a curved surface, when a tool moves along a tool path composed of a plurality of command points and straight lines connecting the command points, the tool separates from the target shape or encroaches on the inside of the target shape between the command points. Further, if a command point is set at an inappropriate position, the tool separates from the target shape or encroaches on the inside of the target shape even at the command point. This results in an error in the shape of the machined workpiece, with respect to the target shape. Under the circumstances described above, there is a demand for a tool path correction device that is capable of correcting a tool path along which a tool moves so as to allow a workpiece to be accurately machined into a target shape.

Means for Solving the Problems

An aspect of the present disclosure is directed to a tool path correction device including: a tool path acquisition unit configured to acquire tool path information that specifies a tool path along which a tool for machining a workpiece moves, by means of a plurality of command points through which the tool is to pass; a tool shape acquisition unit configured to acquire tool shape information that specifies a shape of the tool; a target shape acquisition unit configured to acquire target shape information that specifies a target shape of the workpiece after being machined; and a command point addition unit configured to add an additional command point to a position close to a feature change point where a feature of the target shape changes, the additional command point serving as a new command point included in the plurality of command points.

Effects of the Invention

The tool path correction device according to the present disclosure is capable of correcting a tool path along which a tool moves so as to allow a workpiece to be accurately machined into a target shape.

PREFERRED MODE FOR CARRYING OUT THE INVENTION

First Embodiment

Figure 1:
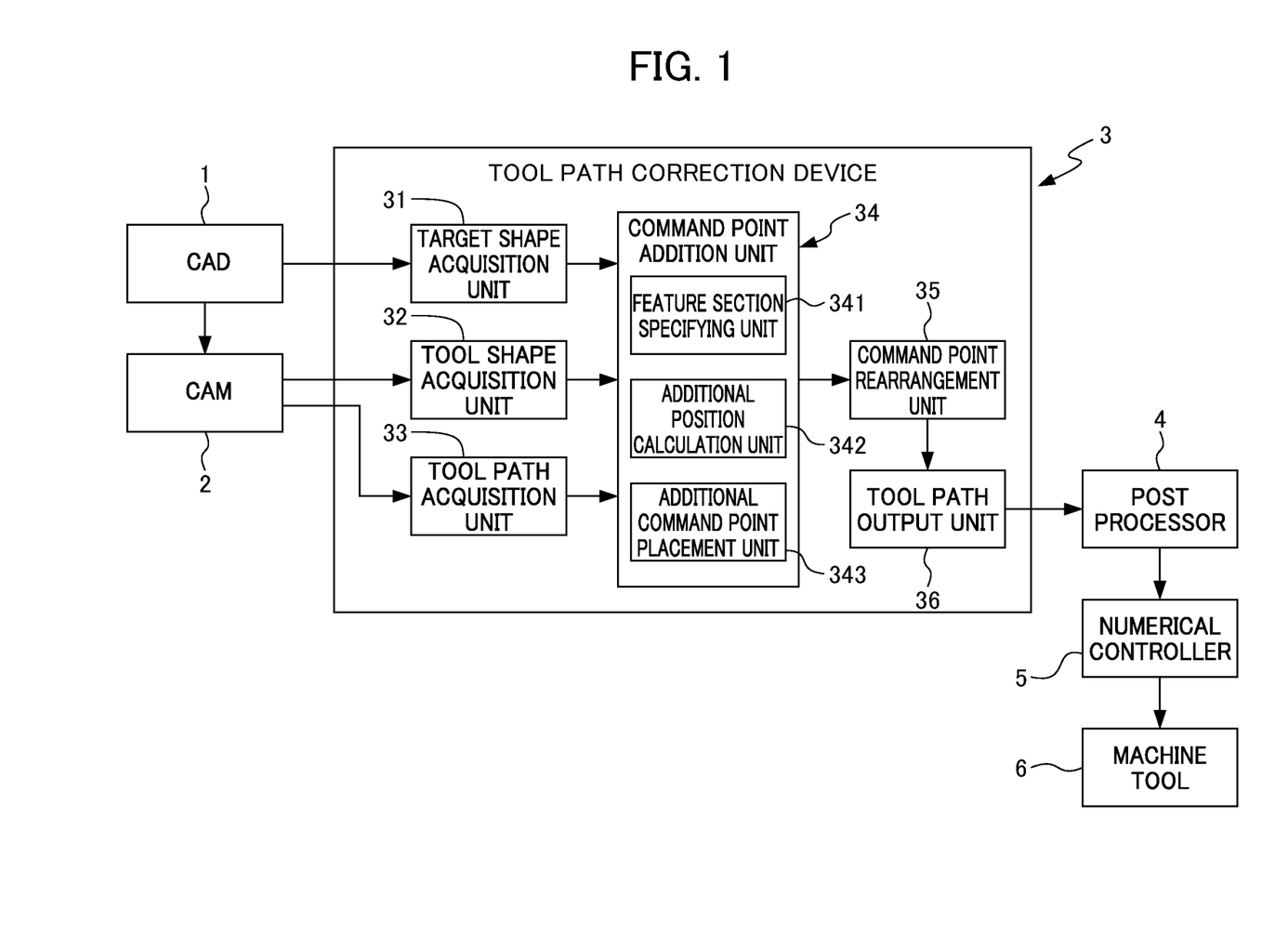
FIG. 1 is a block diagram illustrating a configuration of a machining system including a tool path correction device according to a first embodiment of the present disclosure.

Embodiments of the present disclosure will be described with reference to the drawings. FIG. 1 is a block diagram illustrating a configuration of a machining system including a tool path correction device according to a first embodiment of the present disclosure. The machining system illustrated in FIG. 1 includes a CAD system 1, a CAM system 2, a tool path correction device 3 according to an embodiment of the present disclosure, a post processor 4, a numerical controller 5, and a machine tool 6.

The CAD system 1 is a known system for producing a design with the aid of a computer. Specifically, the CAD system 1 is used to design a target shape (product shape, component shape, etc.) that a workpiece should have after being machined by the machine tool 6. The target shape may be specified by a flat plane, a cylindrical surface, a spherical surface, a Bezier surface, a NURBS curved surface, or the like.

The CAM system 2 is a known system for generating a machining program or the like that the numerical controller 5 executes to control the machine tool 6 to thereby machine a workpiece into a target shape designed with the CAD system 1. The CAM system 2 generates tool path information that specifies a tool path along which a tool for machining a workpiece moves, by means of a plurality of command points through which the tool should pass. For this purpose, the CAM system 2 may generate a shape of a machining region corresponding to the target shape created by the CAD system 1. The tool path information may be generated in a cutter location (CL) data format in which the configuration and setting specific to the machine tool 6 are not taken into account.

The tool path information may include information indicating which portion of the tool moves along the tool path. Examples of such a tool portion that moves along the tool path (hereinafter, may be referred to as a reference point) include a tool tip, a center of a tool shape (e.g., a center of a ball of a ball end mill), etc. Furthermore, the tool path information may include information indicating whether the tool traveling along the tool path makes a movement with cutting or a movement without cutting (rapid traverse, approach, retraction, etc.). Moreover, the tool path information may include information indicating a specific feed speed for when the tool moves along the tool path.

The tool path correction device 3 includes a target shape acquisition unit 31, a tool shape acquisition unit 32, a tool path acquisition unit 33, a command point addition unit 34, a command point rearrangement unit 35, and a tool path output unit 36. The tool path correction device 3 can be implemented by, for example, causing a computer including a CPU, a memory, an input/output interface, and the like to execute an appropriate control program. The target shape acquisition unit 31, the tool shape acquisition unit 32, the tool path acquisition unit 33, the command point addition unit 34, the command point rearrangement unit 35, and the tool path output unit 36 of the tool path correction device 3 are functionally distinguishable from each other, and do not have to be clearly distinguishable from each other in terms of physical configuration and program configuration. The tool path correction device 3 may be integrated with another device such as the CAM system 2 and the post processor 4. That is, the tool path correction device 3 may be implemented by addition of a control program to the CAM system 2, the post processor 4, or the like.

The target shape acquisition unit 31 acquires target shape information that specifies a target shape of a workpiece after being machined. The target shape information may be information regarding a product shape generated by the CAD system 1 or information regarding a shape of a machining region created by the CAM system 2 (e.g., a shape of a surface to be machined, approximated as a collection of a plurality of planes). That is, the target shape acquisition unit 31 may acquire the target shape information from the CAD system 1 as illustrated in the figure, or may acquire the target shape information from the CAM system 2. The target shape acquisition unit 31 may acquire the target shape information from a different device or a recording medium.

The tool shape acquisition unit 32 acquires tool shape information that specifies a shape of a tool. The tool shape acquisition unit 32 may be configured to acquire, from the CAM system 2, the tool shape information used by the CAM 2 to generate the tool path information. The tool shape acquisition unit 32 may be configured to acquire the tool shape information from a server (not shown), a recording medium, or the like.

A tool for use in the machining system of the present embodiment is not necessarily limited to a particular one, but is typically a milling tool. Specific examples of the milling tool include a ball end mill, a radius end mill, a square end mill, a lens type mill, a barrel type mill, and a tapered mill.

The tool path acquisition unit 33 acquires the tool path information generated by the CAM system 2. The tool path acquisition unit 33 may acquire the tool path information via a server (not shown), a recording medium, or the like.

The command point addition unit 34 adds an additional command point as a new command point to a position close to a feature change point where the feature of the target shape changes. A portion where the feature of the target shape changes, such as a boundary between a flat surface and a curved surface, often requires high machining accuracy. Placing a command point at such a position is effective in reducing errors between the tool path and the target shape and improving machining accuracy. Specifically, placing a command point, through which the tool is to pass, at a position close to the feature change point of the target shape makes it possible to reduce, between the command points, an extent to which the tool separates from the target shape or encroaches on the inside of the target shape. Note that "being close" means being at a short distance which is, for example, equal to or smaller than the diameter of the tool, and includes a case where the distance is zero.

The feature change point preferably includes at least one selected from a minimum point of a radius of curvature of the target shape, a point of discontinuity of change in a radius of curvature of the target shape, and a boundary point between curved surfaces forming the target shape, and particularly preferably includes the minimum point of a radius of curvature of the target shape. The radius of curvature may be represented by a rate of change in the normal direction of the target shape. The change in the radius of curvature may be expressed as a change in the position of the center of the radius of curvature. The feature change point may include a point having another specified shape feature. An edge of the target shape, i.e., a point at which the normal direction discontinuously changes can be interpreted as a point at which the radius of curvature is zero from the viewpoint of the limit value, and can be interpreted as a point at which the rate of change in the normal direction is infinity.

The command point addition unit 34 may include: a feature section specifying unit 341 configured to specify a feature section close to the feature change point, from among a plurality of sections delimited by the command points of the tool path; an additional position calculation unit 342 configured to calculate an additional position that is for the tool and corresponds to the feature change point; and an additional command point placement unit 343 configured to place the additional command point at the additional position.

The feature section specifying unit 341 may determine whether or not a section of the tool path is close to the feature change point, based on a feature amount of the target shape at a cutting point calculated for the tool positioned at a preceding command point from which the section starts, and a feature amount of the target shape at a cutting point calculated for the tool positioned at a subsequent command point at which the section ends. The feature amount of the target shape includes, for example, a radius of curvature, a normal direction, and a center position of the radius of curvature at the respective cutting point. Specifically, for example, the feature section specifying unit 341 can determine that a section is close to the feature change point when a value (change rate) calculated by dividing an amount of change between the feature amount at the preceding command point and the feature amount at the subsequent command point by a distance between the preceding and subsequent command points is larger than a preset threshold value. The cutting point can be calculated as a contact point between the tool shape and the target shape or a closest point (i.e., a point that is on the target shape and closest to the tool shape).

In a case where the target shape is composed of a plurality of surfaces connected to each other, the feature section specifying unit 341 may determine that a section is close to the feature change point when a surface including a cutting point according to the preceding command point differs from a surface including a cutting point according to the subsequent command point. The feature section specifying unit 341 may determine that a section is close to the feature change point when other preset conditions are satisfied.

The additional position calculation unit 342 can calculate the position of the feature change point by, for example, dichotomizing search. Specifically, for example, the additional position calculation unit 342 may specify the position of a closest point to the feature change point by repeatedly performing a process including: calculating a feature amount at a midpoint between two command points, comparing differences in the feature amount between the ends of two subsections divided by the midpoint, determining that the closet point to the feature change point is contained in one of the two subsections with the lager difference in the feature amount, further dividing the subsection determined to contain the closest point into two divisional subsections, and selecting one containing the closest point from the two divisional subsections. When a difference between the amounts of change in the feature amount between two divisional subsections is equal to or less than a predetermined threshold value, it is determined that the midpoint between the two divisional subsections is the closest point to the feature change point, and the repetition of the process can be ended. Alternatively, the additional position calculation unit 342 may determine that a midpoint is the closest point in a case where the length of a divisional subsection is equal to or less than a predetermined threshold value.

Based on the position of the calculated closest point serving as a reference position, the additional position calculation unit 342 calculates an additional position at which the tool shape of the tool position threat comes into contact with the target shape. For example, the additional position calculation unit 342 may calculate the additional position at which the tool shape comes into contact with the target shape by moving the closest point in the direction of the rotation axis of the tool, a normal direction of the target shape, or a direction along a restraint surface including three command points in proximity to the closest point.

The additional command point placement unit 343 inserts, as an additional command point, information indicating the additional position calculated by the additional position calculation unit 342 into the tool path information. Since excessively narrow intervals between the command points may prevent the tool from moving smoothly, the additional command point placement unit 343 may be configured to erase, from the tool path information, information regarding a command point(s) within a certain distance from the additional position.

The command point rearrangement unit 35 rearranges command points in the vicinity of the additional command point. For example, the command point rearrangement unit 35 rearranges preceding and subsequent command points that are present in a range in which a tool path length (the sum of the distances between the command points) from the additional command point is equal to or less than a preset distance. In a case where the vicinal range contains an existing additional command point placed therein, rearrangement based on the existing additional command point as a reference position and rearrangement based on an adjacent additional command point as a reference position may be performed in the following manner in order to avoid a situation in which the same command points are subjected to the rearrangements in an overlapping manner. For example, it is possible that the rearrangement based on the existing additional command point as a reference position is performed up to the command point immediately before the adjacent additional command point, and the command points subjected to the foregoing rearrangement are excluded from the target of the rearrangement based on the adjacent additional command point as a reference position. Alternatively, it is possible that a midpoint is set between the existing the additional command point and the adjacent additional command point, the rearrangement based on the existing additional command point as a reference position is performed on command points located toward the existing additional command point with respect to the midpoint, and command points located farther from the existing additional command point with respect to the midpoint are subjected to the rearrangement based on the adjacent additional command point as a reference position.

The command point rearrangement unit 35 may rearrange the command points at substantially equal intervals, or may rearrange the command points such that the density of the command points increases as the curvature of the target shape increases. Rearrangement of a group of command points may be performed by temporarily arranging the command points on a straight line connecting two command points (at least one of which is an additional command point) that are adjacent to the group, and adjusting the positions of the temporarily arranged command points such that the tool shape comes into contact with the target shape, in the same manner as the additional position calculation unit 342 calculating the additional position.

The tool path output unit 36 stores the tool path information corrected by the command point addition unit 34 and the command point rearrangement unit 35, and outputs the tool path information to the post processor 4 as necessary.

The post processor 4 converts the data format of the tool path information outputted from the tool path correction device 3 into a data format that can be processed by the numerical controller 5. Typically, the post processor 4 converts the tool path information in the CL data format into G codes. A well-known post processor can be used as the post processor 4.

The numerical controller 5 controls the machine tool 6 in accordance with the tool path information inputted from the post processor 4. A well-known numerical controller can be used as the numerical controller 5.

The machine tool 6 machines a workpiece using a tool, in accordance with commands from the numerical controller 5. A well-known machine tool can be used as the machine tool 6.

Figure 2:
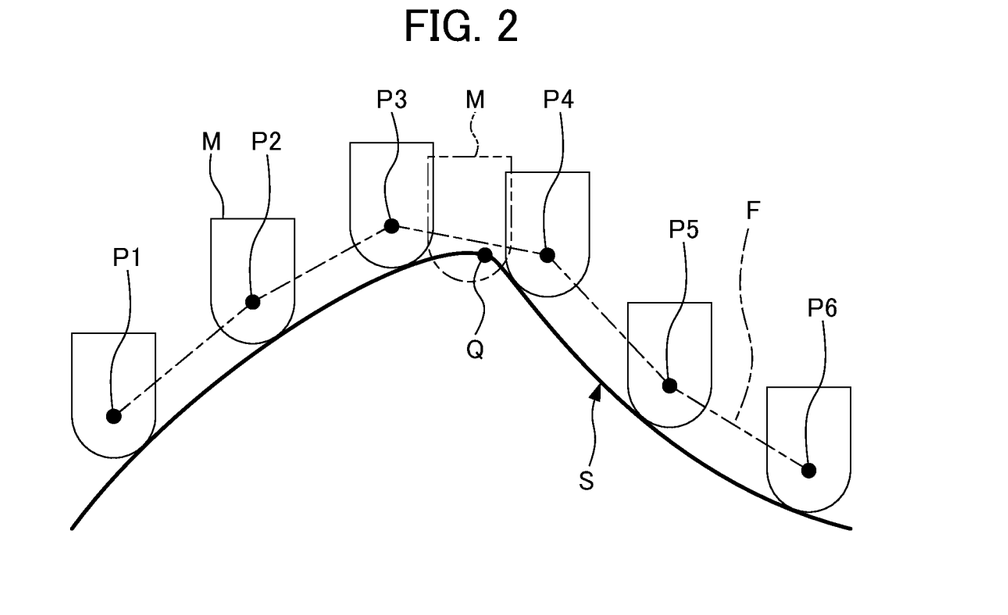
FIG. 2 is a schematic diagram illustrating a tool path created with a CAM system.
Figure 3:
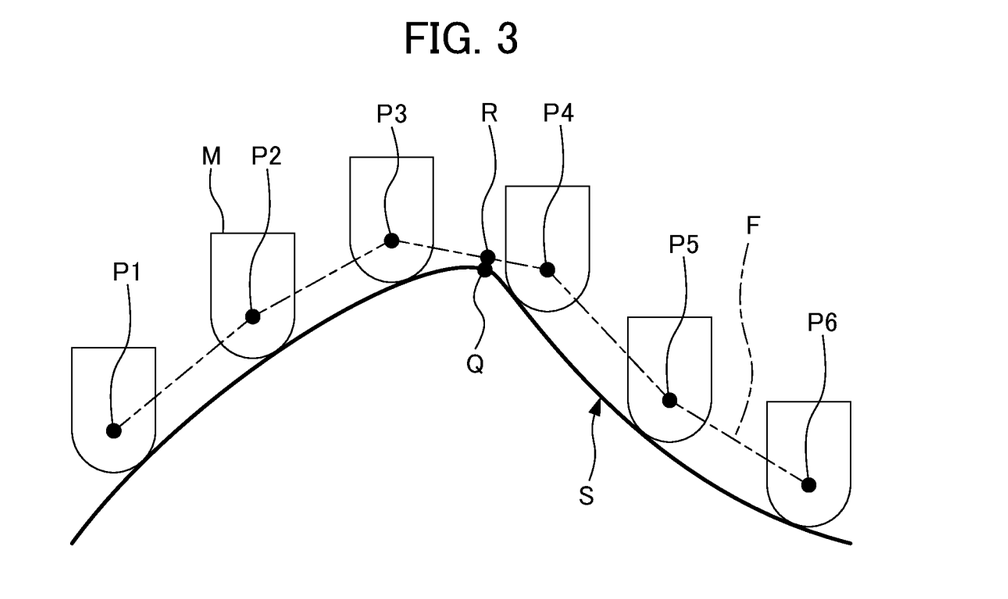
FIG. 3 is a schematic diagram corresponding to FIG. 2 and illustrating a closest point to a feature change point.
Figure 4:
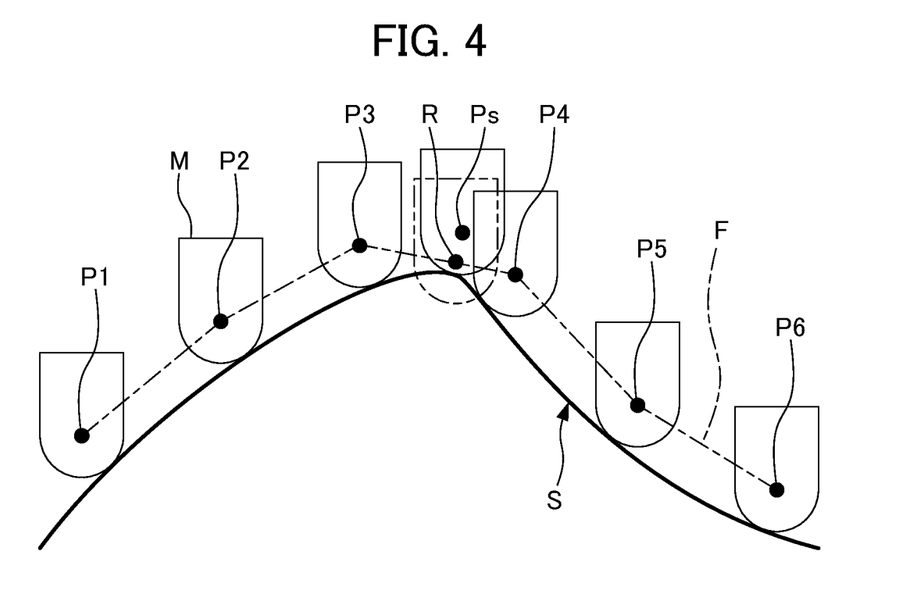
FIG. 4 is a schematic diagram corresponding to FIG. 3, and illustrating placement of an additional command point that is inserted in correspondence with the closest point.
Figure 5:
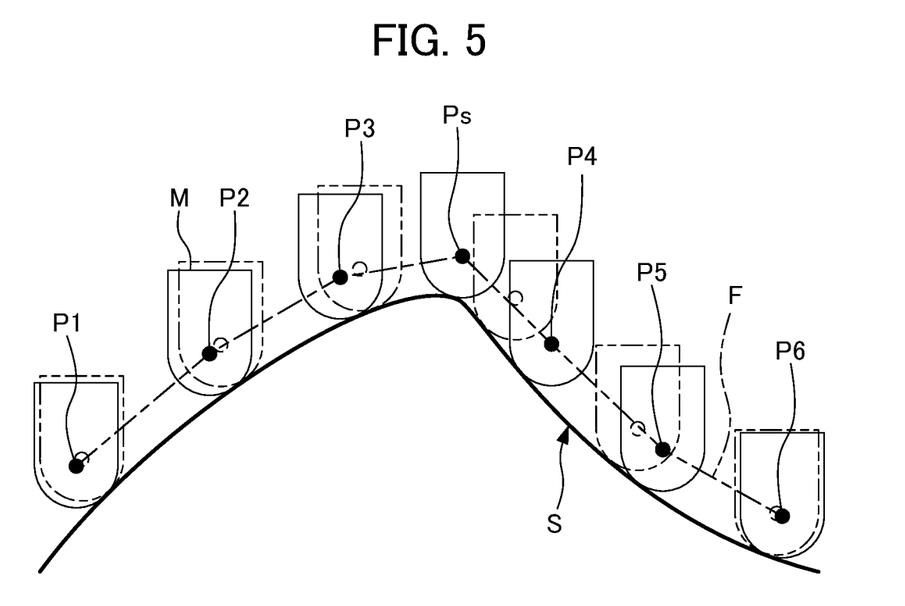
FIG. 5 is a schematic diagram corresponding to FIG. 4 and illustrating rearrangement of command points based on the additional command point as a reference position.

FIGS. 2 to 5 schematically illustrate insertion of an additional command point and rearrangement of the command points performed by the command point addition unit 34. FIG. 2 illustrates a target shape S having a feature change point Q, a tool path F generated by the CAM system 2 and specified by command points P1 to P6, and a tool shape M at each of the command point P1 to P6. FIG. 3 illustrates a closest point R to the feature change point Q of the tool path F. FIG. 4 illustrates placement of an additional command point Ps inserted in correspondence with the closest point R. FIG. 5 illustrates rearrangement of the command points P1 to P6 based on the additional command point Ps as a reference position.

As illustrated in FIG. 2, in a case where the feature change point Q, at which a feature amount such as a radius of curvature of the target shape S changes, is between and apart from the command points P3 and P4, the tool (tool shape M) moves linearly between the command points P3 and P4, which may result in that the tool shape M encroaches on the inside of the target shape S at the feature change point Q, as indicated by a two-dot chain line.

First, the feature section specifying unit 341 specifies that the section between P3 and P4 is close to the feature change point Q by way of the above-described process. Next, the additional position calculation unit 342 calculates the closest point R to the feature change point Q on the tool path F in the section between P3 and P4 by way of the above-described process (FIG. 3). Subsequently, the additional position calculation unit 342 moves the tool shape M having its reference point set at the closest point R, to a position at which the tool shape M comes into contact with the target shape S at one point, and determines the reference point of the tool shape M after having been moved as an additional position where the additional command point Ps should be placed (FIG. 4).

As illustrated in FIG. 5, the command point rearrangement unit 35 rearranges the preceding and subsequent command points P1 to P6 based on the additional command point Ps as a reference position to thereby ensure smooth movement of the tool in conformity with the target shape S, and reduces a positional deviation of the tool in adjacent path sections.

As described above, in the machining system of the present embodiment, the tool path correction device 3 causes the command point addition unit 34 to add the additional command point to a position close to the feature change point of the target shape, thereby making it possible to correct the tool path so as to reduce an extent to which the tool separates from the target shape or encroaches on the inside of the target shape between the command points. Thus, the machining system of the present embodiment makes it possible to accurately machine a workpiece into a target shape.

Furthermore, in the machining system of the present embodiment, the tool path correction device 3 includes the command point rearrangement unit 35 for rearranging the command points in the vicinity of the feature change point of the target shape, thereby making it possible to reduce a positional deviation of the command points in adjacent path sections in the vicinity of the feature change point. As a result, minor errors occurring between command points in adjacent path sections have the same tendency, making it unlikely for machining marks such as stripe patterns to be formed along the movement path of the tool.

Second Embodiment

Figure 6:
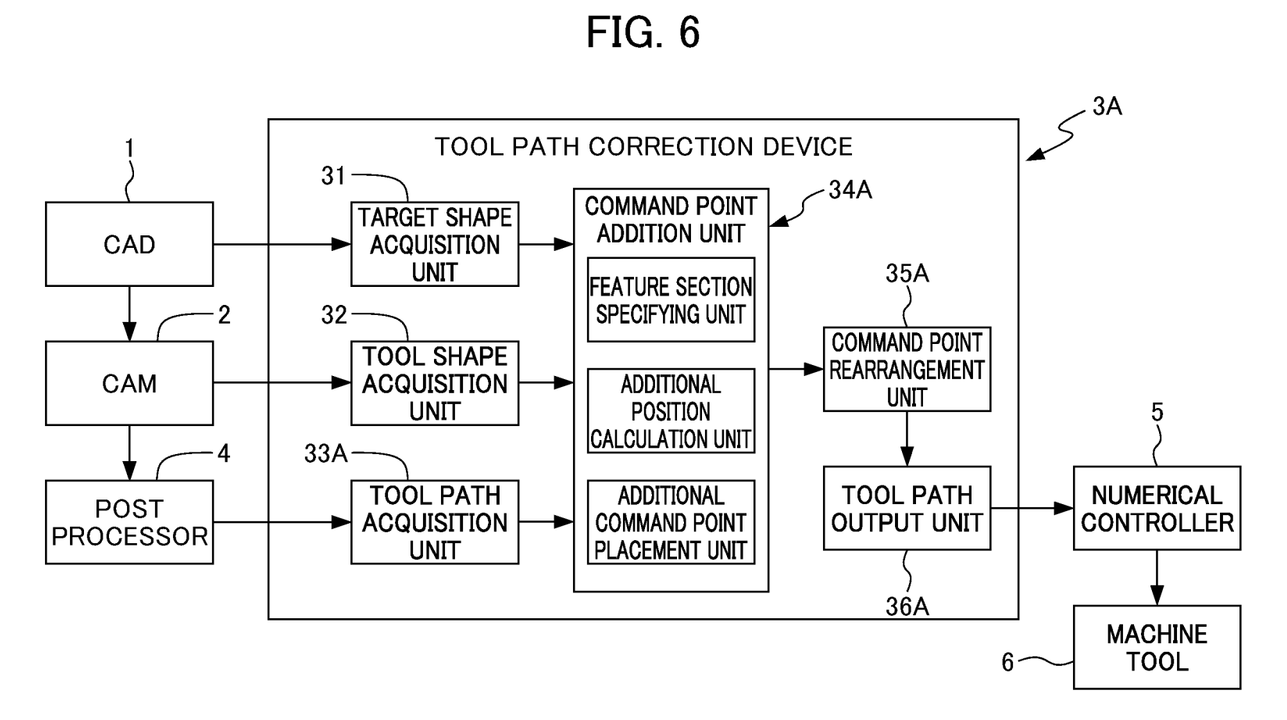
FIG. 6 is a block diagram illustrating a configuration of a machining system including a tool path correction device according to a second embodiment of the present disclosure.

FIG. 6 is a block diagram illustrating a configuration of a machining system including a tool path correction device according to a second embodiment of the present disclosure. The machining system of FIG. 6 includes a CAD system 1, a CAM system 2, a tool path correction device 3A according to an embodiment of the present disclosure, a post processor 4, a numerical controller 5, and a machine tool 6. For the machining system illustrated in FIG. 6, the same components as those of the machining system illustrated in FIG. 1 are denoted by the same reference signs, and a description thereof is not repeated. In the machining system illustrated in FIG. 6, the tool path correction device 3A corrects a machining program that is inputted to the numerical controller 5 from the post processor 4 and is written using, for example, G codes.

The tool path correction device 3A includes a target shape acquisition unit 31, a tool shape acquisition unit 32, a tool path acquisition unit 33A, a command point addition unit 34A, a command point rearrangement unit 35A, and a tool path output unit 36A. The tool path correction device 3A can be implemented by causing a computer including, for example, a CPU, a memory, an input/output interface, and the like to execute an appropriate control program, and may be integrated with, for example, the post processor 4 or the numerical controller 5.

The tool path acquisition unit 33A acquires tool path information from the post processor 4. Accordingly, the tool path acquired by the tool path acquisition unit 33A is in, for example, a G code format.

The command point addition unit 34A, the command point rearrangement unit 35A, and the tool path output unit 36A in the machining system of FIG. 6 are functionally the same as the command point addition unit 34, the command point rearrangement unit 35, and the tool path output unit 36 in the machining system illustrated in FIG. 1, but the details of the program and the like for use in the machining system of FIG. 6 may be different due to the difference in the format in which the tool path is written.

While the embodiments of the present disclosure have been described above, the present disclosure is not limited to the embodiments described above. The effects described in the above embodiments are merely examples of the most preferred effects provided by the present disclosure, and the effects of the present disclosure are not limited to those described in the above-described embodiments.

In the tool path correction device according to the present disclosure, the command point rearrangement unit may be omitted. In a case where the tool path correction device according to the present disclosure is integrated with the numerical controller, the tool path output unit may be omitted.

EXPLANATION OF REFERENCE NUMERALS

1: CAD system
2: CAM system
3, 3A: Tool path correction device
4: Post processor
5: Numerical controller
6: Machine tool
31: Target shape acquisition unit
32: Tool shape acquisition unit
33, 33A: Tool path acquisition unit
34, 34A: Command point addition unit
341: Feature section specifying unit
342: Additional position calculation unit
343: Additional command point placement unit
35, 35A: Command point rearrangement unit
36, 36A: Tool path output unit

The invention claimed is:
1. A tool path correction device connected to a post processor or a numerical controller comprising a memory and a processor, wherein the processor:
acquires tool path information that specifies a tool path along which a tool for machining a workpiece moves, by means of a plurality of command points through which the tool is to pass;
acquires tool shape information that specifies a shape of the tool;
acquires target shape information that specifies a target shape of the workpiece after being machined;
adds an additional command point to a position, wherein a distance between a feature change point where a feature of the target shape changes and the position is equal to or smaller than a diameter of the tool, the additional command point serving as a new command point included in the plurality of command points; and rearranges, based on the additional command point as a reference position, the command points of the plurality of command points preceding and subsequent of the additional command point;

wherein the memory stores a corrected tool path information in which the additional command point is added and the command point is rearranged; and wherein the processor outputs the corrected tool path information to the post processor or the numerical controller in a format as a CL data format or a machining program so that a machine tool is operated based on the corrected tool path information.

2. The tool path correction device according to claim 1, wherein the processor, to add the additional command point:

specifies a feature section where a distance from the feature change point is equal to or smaller than a diameter of the tool, from among a plurality of sections of the tool path, the plurality of sections being delimited by the command points;

calculates an additional position for the tool, the additional position corresponding to the feature change point; and places the additional command point at the additional position.

3. The tool path correction device according to claim 1, wherein the feature change point includes at least one selected from a minimum point of a radius of curvature of the target shape, a point of discontinuity of change in the radius of curvature of the target shape, and a boundary point between surfaces forming the target shape.

* * * * *